(12) United States Patent
Hu et al.

(10) Patent No.: US 10,185,762 B2
(45) Date of Patent: Jan. 22, 2019

(54) PREDICTIVE ALGORITHM FOR SEARCH BOX AUTO-COMPLETE

(71) Applicant: eBay Inc., San Jose, CA (US)

(72) Inventors: Wenyan Hu, Shanghai (CN); Xiaodi Zhang, New York, NY (US); Alvaro Bolivar, San Francisco, CA (US); Randall Scott Shoup, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/665,796

(22) Filed: Mar. 23, 2015

(65) Prior Publication Data

US 2015/0193449 A1 Jul. 9, 2015

Related U.S. Application Data

(63) Continuation of application No. 12/346,720, filed on Dec. 30, 2008, now Pat. No. 8,990,240.

(51) Int. Cl.
*G06F 17/30* (2006.01)

(52) U.S. Cl.
CPC ...... *G06F 17/3064* (2013.01); *G06F 17/3097* (2013.01)

(58) Field of Classification Search
CPC ............. G06F 17/3097; G06F 17/3064; G06F 17/30407; G06F 17/276
USPC ........................................ 707/758, 765–768
See application file for complete search history.

(56) References Cited

U.S. PATENT DOCUMENTS

| | | | | |
|---|---|---|---|---|
| 6,564,213 | B1 * | 5/2003 | Ortega | G06F 17/3064 |
| 7,882,268 | B1 * | 2/2011 | Broido | H04L 29/12066 709/245 |
| 8,990,240 | B2 | 3/2015 | Hu et al. | |
| 2001/0039562 | A1 * | 11/2001 | Sato | G06F 17/30545 709/202 |
| 2004/0030797 | A1 * | 2/2004 | Akinlar | H04L 47/10 709/232 |
| 2004/0205249 | A1 * | 10/2004 | Berry | H04L 67/02 709/247 |

(Continued)

OTHER PUBLICATIONS

"U.S. Appl. No. 12/346,720, Advisory Action dated Sep. 26, 2011", 3 pgs.

(Continued)

*Primary Examiner* — Thu Nguyet T Le
(74) *Attorney, Agent, or Firm* — Shook, Hardy & Bacon L.L.P.

(57) ABSTRACT

In various exemplary embodiments, systems and associated methods to predict search results in an electronic environment are disclosed. In one embodiment, a method to provide responses to a search request includes receiving, from an end-user, one or more characters that form a portion of the search request. Prior to receiving a completed version of the search request from the end-user, a plurality of keywords is predicted based on the one or more characters. The prediction is based on the most probable keywords selected from a plurality of prior requests stored in a database. A plurality of responses is prepared based on the most probable keywords. The responses are fit within a single communications packet and returned as a reply to the search request. Other systems and methods are disclosed.

10 Claims, 6 Drawing Sheets

(56) References Cited

U.S. PATENT DOCUMENTS

| | | | |
|---|---|---|---|
| 2006/0075120 | A1 | 4/2006 | Smit |
| 2006/0106769 | A1* | 5/2006 | Gibbs ................... G06F 17/276 |
| 2006/0206454 | A1* | 9/2006 | Forstall ............. G06F 17/30864 |
| 2006/0224553 | A1* | 10/2006 | Chtcherbatchenko ....................... G06F 17/2247 |
| 2006/0230350 | A1 | 10/2006 | Baluja |
| 2006/0248078 | A1* | 11/2006 | Gross .................. G06F 17/3064 |
| 2006/0270425 | A1* | 11/2006 | Lee ......................... H03M 7/30 455/466 |
| 2008/0109401 | A1* | 5/2008 | Sareen ................ G06F 17/3064 |
| 2008/0268882 | A1 | 10/2008 | Moloney |
| 2009/0089283 | A1* | 4/2009 | Khasin ................... G06Q 30/00 |
| 2010/0169341 | A1 | 7/2010 | Hu et al. |

OTHER PUBLICATIONS

"U.S. Appl. No. 12/346,720, Examiner Interview Summary dated Nov. 22, 2013", 2 pgs.

"U.S. Appl. No. 12/346,720, Final Office Action dated Jul. 28, 2011", 13 pgs.

"U.S. Appl. No. 12/346,720, Final Office Action dated Oct. 17, 2012", 23 pgs.

"U.S. Appl. No. 12/346,720, Final Office Action dated Nov. 27, 2013", 30 pgs.

"U.S. Appl. No. 12/346,720, Non Final Office Action dated Mar. 28, 2011", 13 pgs.

"U.S. Appl. No. 12/346,720, Non Final Office Action dated Apr. 24, 2013", 23 pgs.

"U.S. Appl. No. 12/346,720, Non Final Office Action dated May 2, 2012", 21 pgs.

"U.S. Appl. No. 12/346,720, Non Final Office Action dated May 29, 2014", 33 pgs.

"U.S. Appl. No. 12/346,720, Non Final Office Action dated Nov. 28, 2011", 19 pgs.

"U.S. Appl. No. 12/346,720, Notice of Allowance dated Nov. 20, 2014", 7 pgs.

"U.S. Appl. No. 12/346,720, Response filed Feb. 18, 2013 to Final Office Action dated Oct. 17, 2012", 15 pgs.

"U.S. Appl. No. 12/346,720, Response filed Mar. 7, 2012 to Non Final Office Action dated Nov. 28, 2011", 15 pgs.

"U.S. Appl. No. 12/346,720, Response filed Mar. 27, 2014 to Final Office Action dated Nov. 27, 2013", 19 pgs.

"U.S. Appl. No. 12/346,720, Response filed May 19, 2011 to Non-Final Office Action dated Mar. 28, 2011", 13 pgs.

"U.S. Appl. No. 12/346,720, Response filed Jul. 24, 2013 to Non Final Office Action dated Apr. 24, 2013", 14 pgs.

"U.S. Appl. No. 12/346,720, Response filed Jul. 31, 2012 to Non Final Office Action dated May 2, 2012", 13 pgs.

"U.S. Appl. No. 12/346,720, Response filed Sep. 15, 2011 to Final Office Action dated Jul. 28, 2011", 12 pgs.

"U.S. Appl. No. 12/346,720, Response filed Sep. 28, 2011 to Advisory Action dated Sep. 26, 2011", 12 pgs.

"U.S. Appl. No. 12/346,720, Response filed Oct. 29, 2014 to Non Final Office Action dated May 29, 2014", 17 pgs.

* cited by examiner

PREDICTIVE ALGORITHM FOR SEARCH BOX AUTO-COMPLETE

PRIORITY

This application is a Continuation of and claims the benefit of priority from U.S. application Ser. No. 12/346,720, entitled "PREDICTIVE ALGORITHM FOR SEARCH BOX AUTO-COMPLETE," filed on Dec. 30, 2008 which is hereby incorporated by reference herein in its entirety.

TECHNICAL FIELD

The present application relates generally to the field of computer technology and, in a specific exemplary embodiment, to a system and method of predictively optimizing a response to a keyword search or query of an end-user.

BACKGROUND

During the past several years, a substantial growth has occurred in the quantity and diversity of information and services available over the Internet. The number of users of the Internet has similarly grown rapidly. A predominant growth area on the Internet has been in the use of the World Wide Web, often referred to as WWW, W3, or simply "the Web." The hyper-text transfer protocol (HTTP) that serves as a foundation protocol for the Web has been widely adopted and implemented in numerous Web browsers and Web servers.

Web browsers provide a convenient user application for receiving textual and graphical information of individual Web pages in a scrollable display page format. The Web pages allow a typical end-user to access a variety of educational, commercial, and retail Web sites through search boxes.

A search box auto-complete function has become an increasingly popular feature of many Web sites in recent years. The feature is now available on many sites, including Shopping.com, Yahoo!®, and Google Toolbar. However, traditional search box auto-complete has no prediction functionality, which means the auto-complete backend system will only respond with a recommended keyword list against the prefix for which the request is made. Thus, the end-user must wait for each prefix to travel to a remote server prior to receiving an answer. Also, there is an increased load on the remote server since the server must match the keyword against the sent prefix every time.

BRIEF DESCRIPTION OF DRAWINGS

Various ones of the appended drawings merely illustrate exemplary embodiments of the present invention and must not be considered as limiting its scope.

DETAILED DESCRIPTION

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on end-user queries in an electronic retail environment, the embodiments are given merely for clarity in disclosure. Thus, any type of electronic commerce or electronic business system and method, including various system architectures, may employ various embodiments of the end-user query auto-complete system and method described herein and is considered as being within a scope of the present invention.

In an exemplary embodiment, a system to predict search results in an electronic environment is disclosed. The system architecture includes a communications module to receive a query from a remote end-user. The query can include one or more characters contained within a first single communications packet, such as a transmission control protocol (TCP) packet. A query engine is coupled to the communications module. The query engine uses the characters from the query to predictively match keywords contained within a data structure (e.g., a database). A response is formed from the one or more characters. The response is then transmitted back to the end-user within a second single TCP communications packet.

In another exemplary embodiment, a method to provide a plurality of responses to a search request from an end-user is disclosed. The method includes receiving a first single communications packet that contains one or more characters from the search request. A plurality of keywords is predicted based on the characters with a plurality of responses selected from the keywords. The plurality of responses is then formed to fit within a second single TCP communications packet. The plurality of responses is returned concurrently to the end-user, all within the single packet.

In another exemplary embodiment, a processor-readable storage medium is disclosed. The processor-readable storage medium stores an instruction that, when executed by a processor, causes the processor to perform a method to provide a plurality of responses to a search request from an end-user. The method includes receiving a first single communications packet that contains one or more characters from the search request. A plurality of keywords is predicted based on the characters with a plurality of responses selected from the keywords. The plurality of responses is then formed to fit within a second single TCP communications packet. The plurality of responses is returned concurrently to the end-user, all within the single packet.

In another exemplary embodiment, a system architecture to predict search results in an electronic environment is disclosed. The system architecture comprises a communications module to receive a query where the query includes one or more characters contained within a first single communications packet. A searching means uses the one or more characters from the query to predictively match keywords contained within a data structure (e.g., a database). The searching means further forms and transmits a response from the one or more characters within a second single communications packet.

Each of these exemplary embodiments, and others, is discussed in detail, below.

Figure 1:
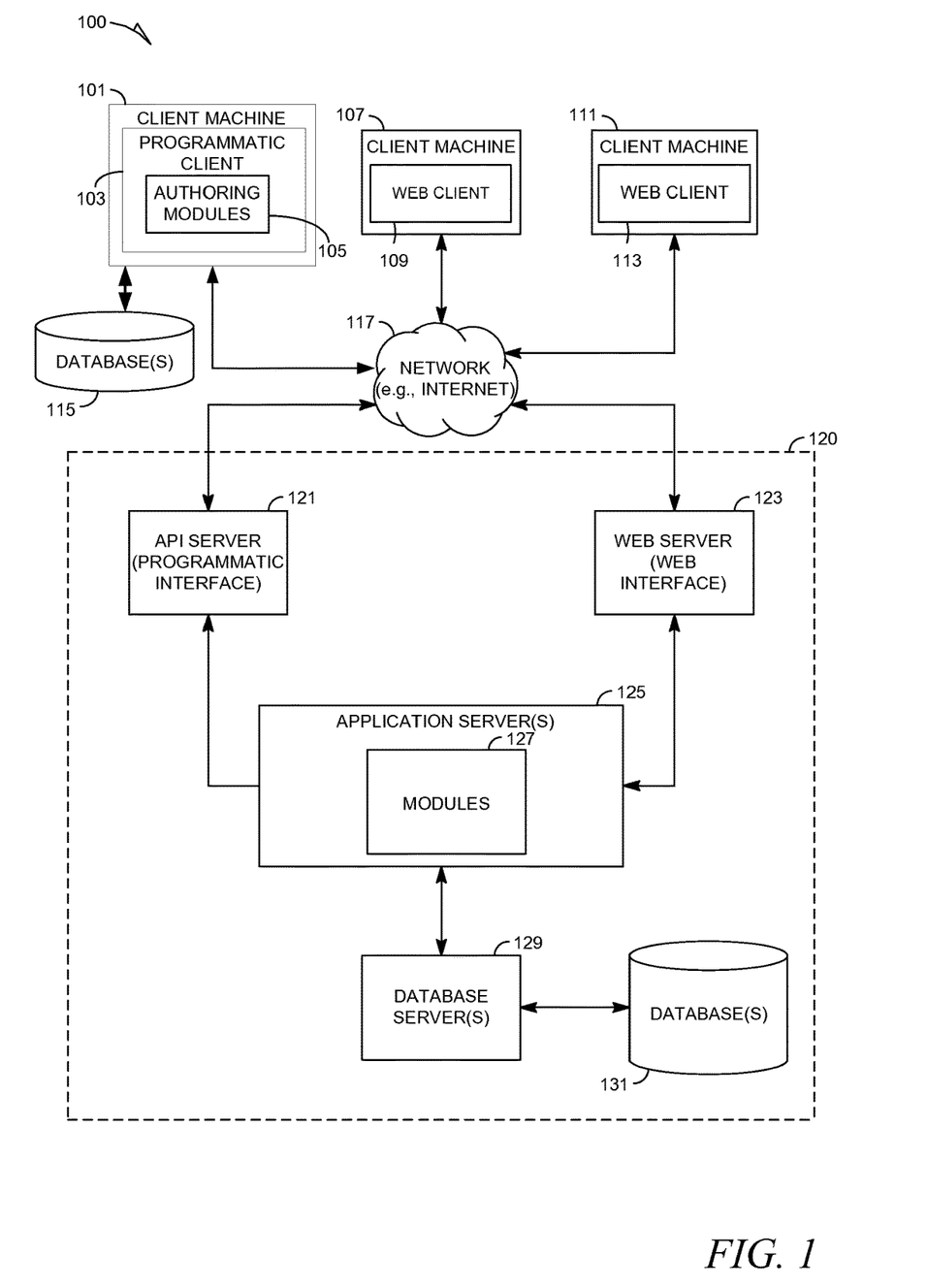
FIG. 1 is a block diagram illustrating an exemplary embodiment of a high-level client-server-based network architecture diagram depicting a system used to process end-user queries.

With reference to FIG. 1, a high-level network diagram of an exemplary embodiment of a system 100 with a client-server architecture includes a first client machine 101, a second client machine 107, a third client machine 111, a network 117 (e.g., the Internet), and an information storage and retrieval platform 120. The information storage and retrieval platform 120 may constitute a commerce platform or commerce server and provides server-side functionality, via the network 117, to the first 101, second 107, and third 111 client machines. A programmatic client 103 in the form of authoring modules 105 is executing on the first client machine 101, a first web client 109 (e.g., a browser, such as the Internet Explorer browser developed by Microsoft Corporation of Redmond, Wash.) is executing on the second client machine 107, and a second web client 113 is executing on the third client machine 111. Additionally, the first client machine 101 is coupled to one or more databases 115.

Turning to the information storage and retrieval platform 120, an application program interface (API) server 121 and a web server 123 are coupled to, and provide programmatic and web interfaces respectively to, one or more application servers 125. The application servers 125 host one or more modules 127 (e.g., modules, applications, engines, etc.). The application servers 125 are, in turn, coupled to one or more database servers 129 that facilitate access to one or more information storage databases 131. The one or more modules 127 provide a number of information storage and retrieval functions and services to users that access the information storage and retrieval platform 120. The one or more modules 127 are discussed in more detail, below.

While the exemplary system 100 of FIG. 1 employs a client-server architecture, a skilled artisan will recognize that the present disclosure is not limited to such an architecture. The exemplary system 100 could equally well find application in a distributed, or peer-to-peer, architecture system. The one or more modules 127 and the authoring modules 105 may also be implemented as standalone software programs, which do not necessarily have networking capabilities.

The first 109 and second 113 web clients access the one or more modules 127 via the web interface supported by the web server 123. Similarly, the programmatic client 103 accesses the various services and functions provided by the one or more modules 127 via the programmatic interface provided by the API server 121. The programmatic client 103 may be, for example, a seller application (e.g., the "Turbo Lister 2" application developed by eBay Inc., of San Jose, Calif.) enabling sellers to author and manage data items or listings on the information storage and retrieval platform 120 in an off-line manner. Further, batch-mode communications can be performed between the programmatic client 103 and the information storage and retrieval platform 120. In addition, the programmatic client 103 may include, as previously indicated, the authoring modules 105 used to author, generate, analyze, and publish domain rules and aspect rules used in the information storage and retrieval platform 120 to structure data items and transform queries. Such domain and aspect rules are known independently in the art.

Figure 2:
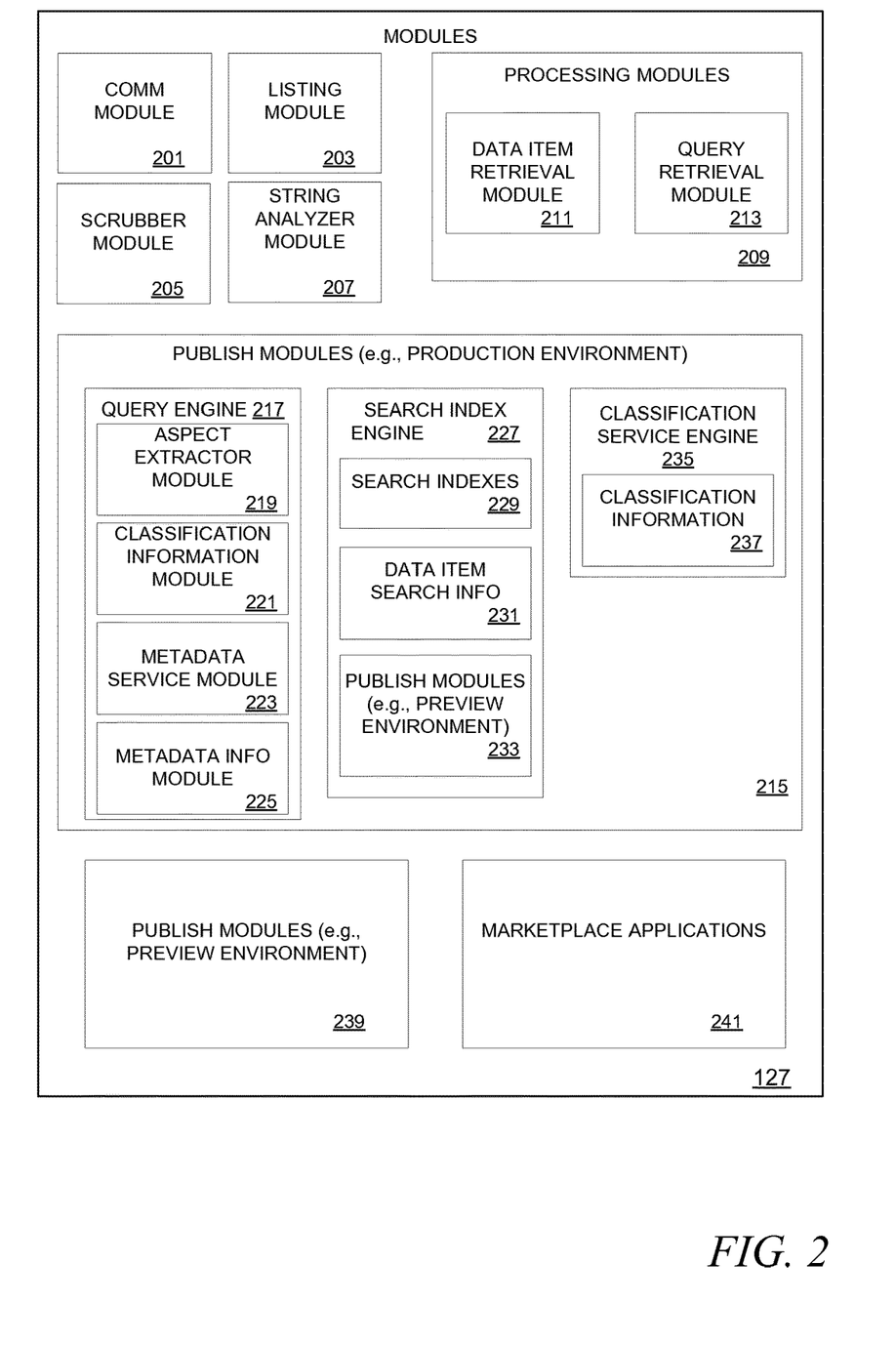
FIG. 2 is a block diagram illustrating an exemplary embodiment of various modules of the network architecture of FIG. 1.

Referring now to FIG. 2, an exemplary block diagram of the one or more modules 127 includes a communication module 201, a listing module 203, a scrubber module 205, a string analyzer module 207, a plurality of processing modules 209, and a first 215 and second 239 publishing module. The first publishing module 215 is used in a production environment while the second publishing module 239 is used in a preview environment. The one or modules 127 further includes a marketplace application block 241. Each of the first 215 and second 239 publishing modules includes a query engine 217, a search index engine 227, and a classification service engine 235 (the individual engines are only shown in the first publishing module 215 but are readily envisioned by a skilled artisan in the second publishing module 239 as well). The first 215 and second 239 publishing modules are each used to publish new or existing rules to either the production environment or the preview environment, as appropriate, in the information storage and retrieval platform 120 of FIG. 1 thereby enabling the rules to be operative (e.g., applied to data items and queries) in the respective environments.

In a specific exemplary embodiment, the information storage and retrieval platform 120 of FIG. 1 may be embodied as a network-based marketplace that supports the transaction of data items or listings (e.g., goods or services) between sellers and buyers. One such marketplace is eBay, the World's Online Marketplace, developed by eBay Inc., of San Jose, Calif. In this specific exemplary embodiment, the information storage and retrieval platform 120 may receive information from sellers describing the data items that may subsequently be retrieved by potential buyers or bidders. The one or more modules 127 may therefore include the marketplace applications 241 to provide a number of marketplace functions and services to end-users that access the information storage and retrieval platform 120.

The preview environment enables a category manager (not shown) to analyze rules and determine whether such rules perform as expected without affecting live operations in the production environment. For example, the preview environment enables a most popular query analysis, a domain coverage analysis, an aspect coverage analysis, and an aspect-value pair coverage analysis as described later in this document. After determining that rules perform as expected, the category manager publishes the rules to the production environment in the information storage and retrieval platform 120.

The communication module 201 receives a query from one or more of the client machines 101, 107, 111 (FIG. 1). The query may include one or more constraints (e.g., keywords, categories, or information specific to a type of data item). The communication module 201 interacts with the query engine 217 and the search index engine 227 to process the query. The communication module 201 receives aspect-value pairs extracted from the query. Further, the communication module 201 constructs a transformed query based on the aspect-value pairs extracted from the query and communicates an interface (e.g., a user interface) to an end-user at one or more of the client machines 101, 107, 111.

A query retrieval module 213 receives information from one or more of the client machines 101, 107, 111 and stores the information as a data item in the one or more information storage databases 131 (FIG. 1). For example, an end-user acting as a seller may operate one of the one or more of the client machines 101, 107, 111 entering descriptive information for a data item for the purpose of offering the data item for sale or auction through the information storage and retrieval platform 120.

The processing module 209 receives classification information and metadata information. The processing module 209 publishes the classification and metadata information to a production environment or a preview environment. The processing module 209 may also publish to the production environment by publishing the classification and metadata information to backend servers (not shown) that host the query engine 217, the search index engine 227, and the classification service engine 235. The processing module 209 publishes to a preview environment by publishing the classification and metadata information to a local backend server (not shown) hosting the query engine 217, the search index engine 227, and the classification service engine 235.

The processing module 209 further includes a data item retrieval module 211 to receive requests for data items from a category manager operating the first client machine 101. For example, responsive to receiving a request, the data item retrieval module 211 reads data items from the data item information stored on the one or more information storage databases 131 (FIG. 1) and stores the data items as sample information in the database 115.

The query retrieval module 213 that receives requests for queries from a category manager operating the first client machine 101. For example, responsive to receiving the request, the query retrieval module 213 reads queries from the sample information and communicates the queries to the first client machine 101.

The scrubber module 205 receives item information entered by one or more of the client machines 101, 107, 111 creating a data item. The scrubber module 205 utilizes services of the classification service engine 235 to structure the item information in the data item (e.g., applies domain and aspect rules).

The string analyzer module 207 receives requests from the first client machine 101 to identify candidate values to associate with an aspect. The request may include the aspect and one or more values that have been associated to the aspect. The string analyzer module 207 utilizes the aspect (e.g., "color") to identify strings of text in a database that includes the aspect. The string analyzer module 207 relies on various services provided in the information storage and retrieval platform 120 to identify and process the strings of text. For example, the string analyzer module 207 utilizes services that expand the aspect to a derivative form of the aspect including a singular form (e.g., "color"), a plural form (e.g., "colors"), a synonymous form, an alternate word form (e.g., "chroma," "coloring," "tint"), a commonly misspelled form (e.g., "collor") or an acronym form.

In a specific exemplary embodiment, the string analyzer module 207 identifies boundaries of a string of text based on a position of the aspect and derivatives thereof in the string of text. For example, the string analyzer module 207 identifies boundaries of the string of text based on a predetermined number of words to the left and right of the aspect in the string of text. The predetermined number of words may be a configurable value. After the strings of text have been identified, the string analyzer module 207 relies on a service in the information storage and retrieval platform 120 to remove any stop words from the strings (e.g., "the," "and," or "if"). For example, stop words may include prepositions and antecedents since they are not candidate values. Next, the string analyzer module 207 removes the aspect values received in the request from the string. Finally, the string analyzer module 207 returns the remaining candidate values to the first client machine 101.

A database (not shown specifically) used by the string analyzer module 207 includes queries that have been entered by a user to the information storage and retrieval platform 120 or data items that have been entered by a user to the information storage and retrieval platform 120, dictionaries, or thesauruses. The string analyzer module 207 analyzes the strings of text to identify candidate values to associate with the aspect. More examples of query strings and searching techniques are given, below.

The classification service engine 235 applies domain rules and aspect rules to data items. For example, the classification service engine 235 applies domain rules to identify one or more domain-value pairs (e.g., product type=electronic MP3 players) associated with the data item. The classification service engine 235 further applies the aspect rules to identify aspect-value pairs (e.g., brand=Apple) associated with the data item. The classification service engine 235 applies the domain and aspect rules to data items or listings as they are added to the information storage and retrieval platform 120 or responsive to the publication of new rules (e.g., domain rules or aspect rules).

The classification service engine 235 processes data items received from the second 107 and third 111 client machines. For example, the scrubber module 205 uses services of the classification service engine 235, as described previously, to apply domain rules and aspect rules to the data item. The classification service engine 235 further stores the data item, with the associated domain-value pairs and aspect-value pairs, in the one or more information storage databases 131 (FIG. 1) as item search information. Further, the classification service engine 235 pushes or publishes item search information over a bus (not shown but implicitly understood by a skilled artisan) in real time to the search index engine 227. The classification service engine 235 executes in the preview environment enabling analysis of newly authored rules before publication of the rules to the production environment. The classification service engine 235 further maintains histogram information in the form of data item counters as the domain and aspect rules are applied to the data items. For example, the classification service engine 235 may increment a data item counter responsive to a condition a clause in a domain or aspect rule evaluating TRUE. The histogram information communicates to one or more of the client machines 101, 107, 111 that use the histogram information to determine percentage coverage for most popular queries, domains, aspects, and aspect-value pairs.

The query engine 217 includes an aspect extractor module 219, a classification information module 221, a metadata service module 223, and a metadata information module 225. In the production environment, the aspect extractor module 219 receives a query from the communication module 201 and applies aspect rules to extract aspect-value pairs from the query. Further, the aspect extractor module 219 communicates the query received from the communication module 201 to the processing module 209 that stores the query as sample query information.

In the preview environment, the aspect extractor module 219 receives the most popular queries from one or more of the client machines 101, 107, 111 and applies aspect rules to extract aspect-value pairs from the query. Further, the aspect extractor module 219 maintains histogram information in the preview environment while applying the aspect rules to the queries. For example, the query engine 217 responds to a condition clause that evaluates TRUE (e.g., matching keyword) by incrementing a data item counter associated with the respective query. Further, in the production environment, the aspect extractor module 219 communicates the aspect-value pairs to the communication module 201.

The metadata service module 223 communicates metadata information to the communication module 201 based on a query received from the communication module 201. The metadata information includes metadata that the communication module 201 uses to format and generate an interface (e.g., a user interface).

The search index engine 227 includes search indexes and data item search information (e.g., including data items and associated domain-value pairs and aspect-value pairs). In the production environment, the search index engine 227 receives the transformed query from the communication module 201 and utilizes the search indexes to identify data items based on the transformed query. Further, in the production environment, the search index engine 227 communicates the found data items to the communication module 201.

Application of Predictive Search Box
Auto-Complete into the Exemplary Network Architecture As noted above, a traditional search box auto-complete process has no prediction functionality. Thus, as an end-user enters search or query data, an auto-complete backend system will only respond with a recommended keyword list against a particular entered prefix for which a request is made.

A browser coupled to an end-user (e.g., to the one or more client machines 101, 107, 111 of FIG. 1) communicates with a remote system (e.g., information storage and retrieval platform 120) via a communications protocol such as the HTTP protocol (known independently to one skilled in the art). The total contents of a single keyword list typically only accounts for approximately one hundred bytes. However, an HTTP header routinely takes about 200 bytes. For a stable (not start-up status) HTTP connection, which is based on the TCP protocol, the HTTP connection is able to carry at least 1460 bytes, exclusive of any overhead in the transmission protocol. The trip time for a package with one byte of information is almost identical to that of a package with 1460 bytes. Thus, there is effectively no additional time required for a round trip of the 1460 byte package. Consequently, the traditional response approach does not make full use of the throughput capability of each HTTP connection.

By implementing a predictive algorithm or method, described below, considerable time is saved for a response to appear to the end-user because numerous trips to and from the remote server are not required. The round trip savings becomes increasingly important with either a slow user connection to the Internet or with heavy traffic in the communications path. Additionally, the load on the remote serve is reduced since the response to the user's query may be available immediately and the remote serve does not need to be accessed multiple times. The predictive method employs data collected and stored in a variety of databases worldwide (e.g., the one or more information storage databases 131 of FIG. 1). A search tree (e.g., a trie tree, known independently in the art) or other structure can be used to anticipate and thus predict the end-users query.

Predictive Method

Figure 3:
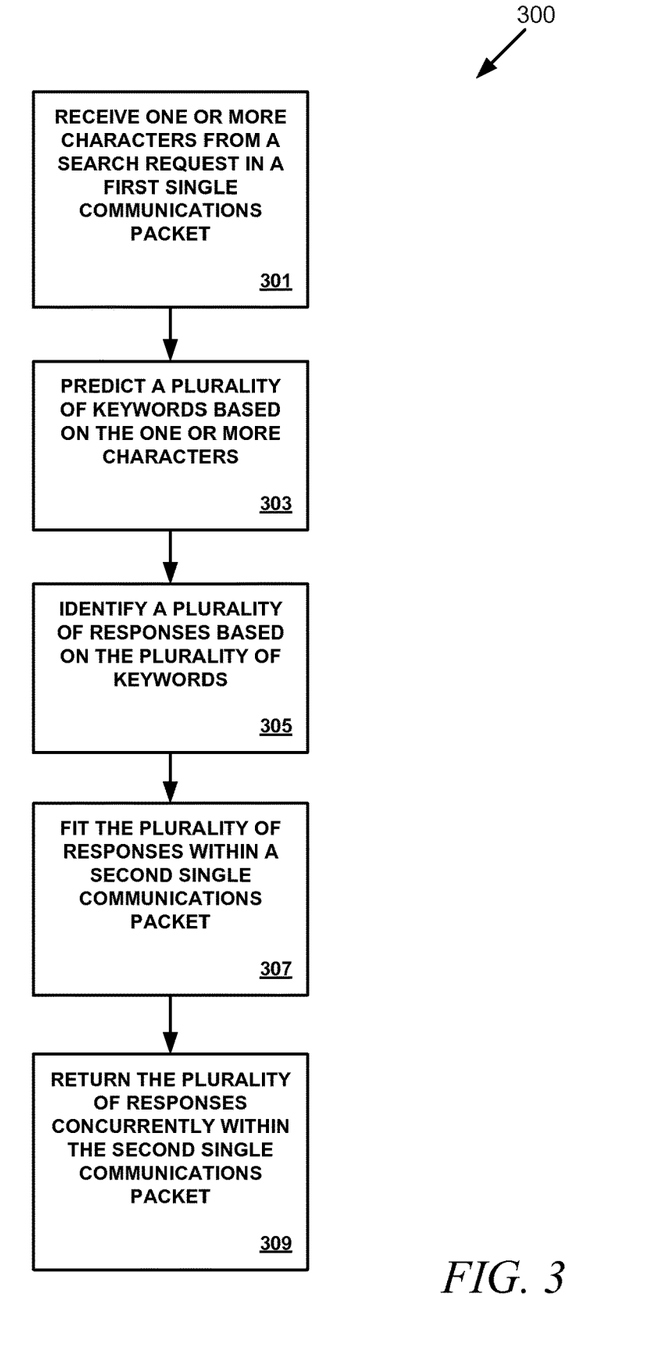
FIG. 3 is a flowchart of an exemplary method for predicting a plurality of keywords and forming a plurality of responses based on the plurality of keywords.

Referring now to FIG. 3, a flowchart 300 of an exemplary method for predicting a plurality of keywords begins with a remote user (not shown) beginning to enter one or more characters to form a search request into a query search box. The one of more characters are received (301) from the search request in a first single communications packet, such as within a single TCP package. A plurality of keywords is then predicted (303) based on the one or more characters even prior to the remote user entering the complete search request. Details of various mechanisms for implementing a predictive process is described in detail, below but is based upon probable keywords selected from a large number of prior requests. Results from other search requests are maintained within a data structure, such as a database. The data structure can further contain specific geographic references. For example, search requests from country "A" can be either similar to or dissimilar to search requests from country "B" due to cultural and economic differences. Such factors can be incorporated into the predictive search for finding the most probable keywords.

A plurality of responses is then formed (305) based on the plurality of keywords predictively selected. The plurality of responses is then fit (307) within a single second communications package. The plurality of responses is then concurrently returned (309) to the remote user within the second single communications package.

Figure 4:
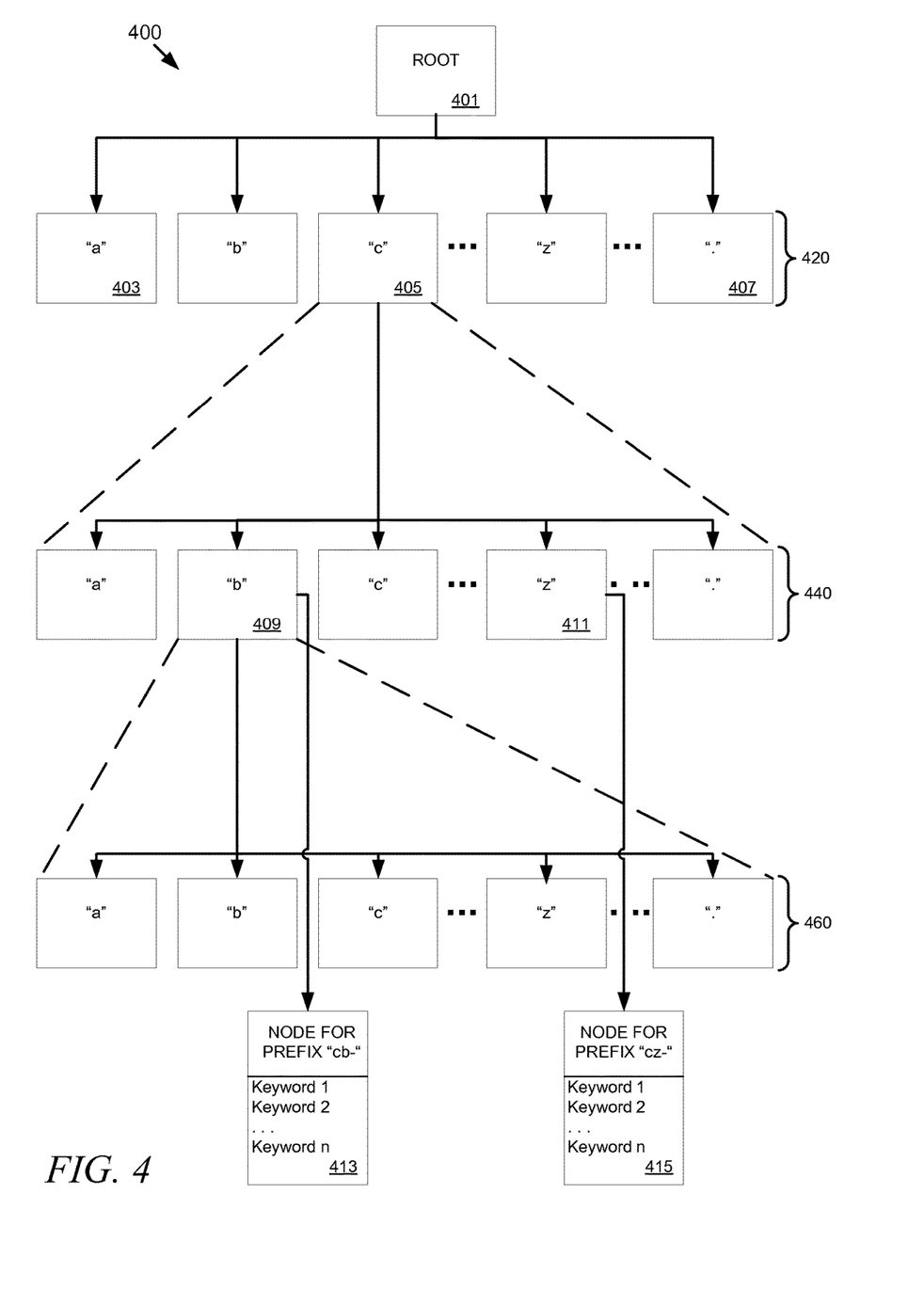
FIG. 4 is a schematic representation of an exemplary trie tree structure used in query and search engines used in the modules of FIG. 2.

With reference now to FIG. 4, an exemplary trie tree structure 400 includes a root node 401, a first level plurality of child nodes 420, a second level plurality of child nodes 440, and a third level plurality of child nodes 460. In this exemplary embodiment, each of the child nodes includes letters "a," "A," "b," "B" through "z," "Z"; numbers "0," "1," through "9"; and characters &, –, +, ', :, ., and " (all characters are shown in bold merely for clarity).

Keywords are selected as a set of equivalent keywords for the prefix. Equivalent keywords are selected by finding all possible prefixes for a group of equivalent words and selecting the best keywords for every prefix from the group.

Each node within the various levels of child nodes 420, 440, 460 has n child nodes, where n is a total count of the letters, numbers, and other characters supported. Information kept in a node includes, for example, a current best keyword for the prefix in the group.

For example, a prefix is entered into the root node 401 of the exemplary trie tree structure 400. Each non-root node at each level represents a supported letter, number, or other character (e.g., an "a" is contained in a first node 403 and a "." is contained in a final node 407 at the first level plurality of child nodes 420). Thus, for each non-root node, there is a corresponding string that represents a prefix. If the prefix entered into the root node 401 contains a "c," then a third node 405 is selected from the first level plurality of child nodes 420. Child nodes of the third node 405 are selected within the second level plurality of child nodes 440. If the second character of the prefix following "c" is a "b," then a second node 409 of the second level plurality of child nodes 440 is chosen. The second node 409 is coupled to a first keyword node 413. Similarly, if the second character of the prefix following "c" is a "z," then a last letter node 411 of the second level plurality of child nodes 440 is chosen. The last letter node 411 is coupled to a second keyword node 415. Either the first 413 or second 415 keyword node containing a plurality of keywords that began with either "cb" or "cz," respectively.

Thus, the exemplary trie tree structure 400 stores all nodes along with corresponding keyword lists. To build the recommendation list file for a node, a keyword is added against a specific prefix. The most probable sub-nodes keyword lists are added to the file. The exemplary trie tree structure 400 is configured to store all nodes and their corresponding keyword lists. When building the recommendation list file for a node, the keyword list is first added against that specific prefix. The most probable sub-nodes keyword lists are then appended to the file. The phrase "most probable sub-node" is practically defined as the sub-node having the most recommendation keywords contained therein. (As used herein, the entire set of letters, numbers, and characters may simply be referred to as characters.)

To make full use of the carrying capability of each HTTP package, the package size is enlarged as much as possible while ensuring that the data transition only takes as little as one TCP package (recall the TCP package size is 1460 bytes, exclusive of overhead). Numerous worst-case scenario testing has been performed to determine a practical upper limit of the package size based on what the network is able to support.

For the testing, network connections from San Jose, Calif. to Shanghai, China were employed. The testing revealed that a practical buffer size upper limit was four kilobytes of useful data that could be sent in a single TCP package. Thus, the worst-case scenario found enlarging the package size to four kilobytes in a single TCP package was consistently possible. A compression algorithm, such as "gzip" (available on-line from http://www.gzip.org/, last viewed Oct. 20, 2008) or other compression utilities known in the art can be used to compress the file before it is sent. A resulting text file less than four kilobytes is generally one kilobyte after compression.

Figure 5:
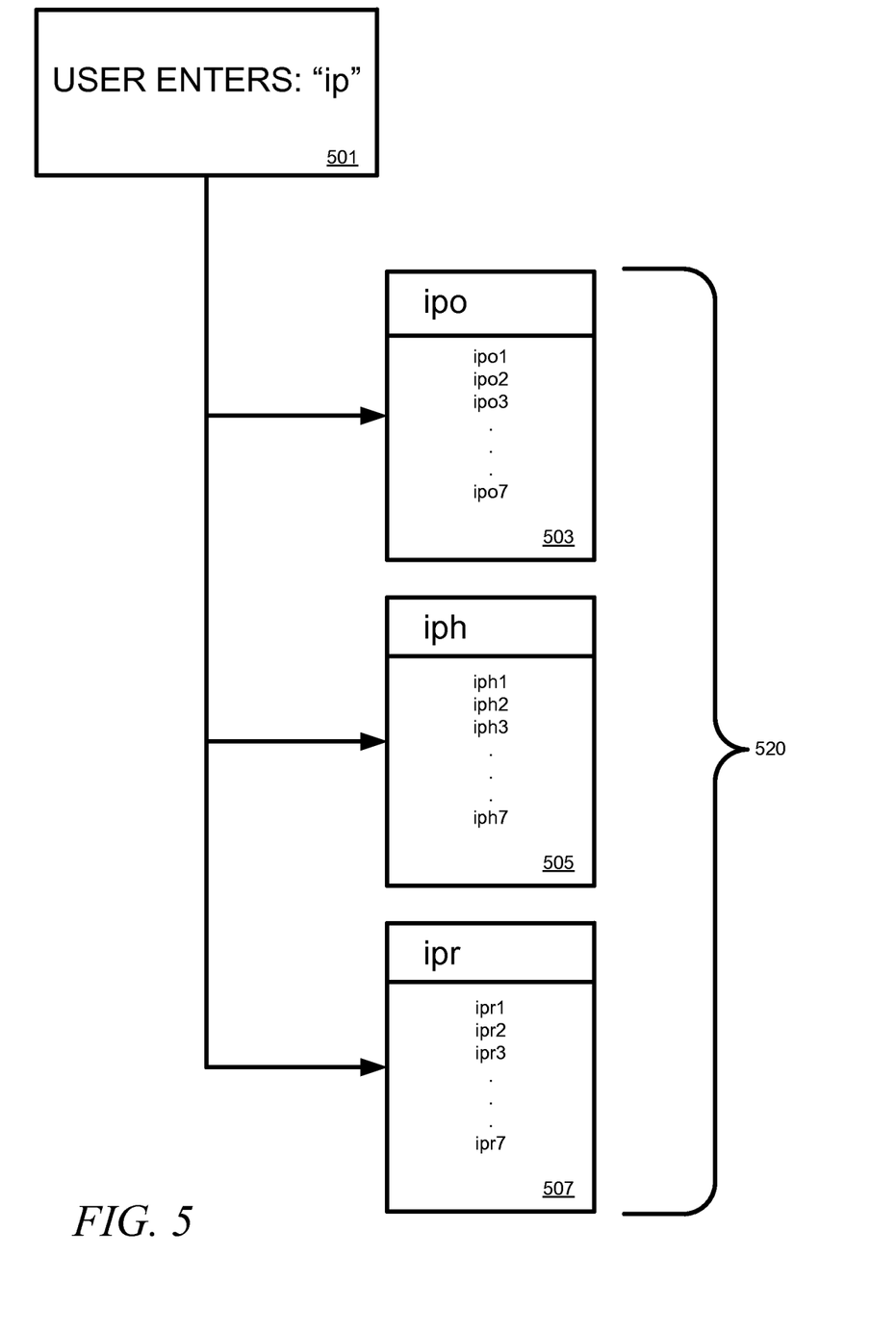
FIG. 5 is a schematic representation of an exemplary pre-computational tree structure of an interchange between an end-user and a server side plurality of responses.

With continuing reference to FIG. 4 and further reference now to a pre-computational tree example 500 of FIG. 5, when the end-user sends a request for a prefix "ip" at a user-node 501, a server side plurality of responses 520 is sent concurrently to the end-user in a single TCP package. The server side plurality of responses 520 includes a keyword list for "ip_" as well as the most probable sub-nodes such as an "ipo_" sub-node 503, an "iph_" sub-node 505, and "ipr_" sub-node 507 and so on to the end-user.

The "ipo_" sub-node 503 includes a plurality of responses (ipo1 to ipo7) to the end-users input "ip." The plurality of responses may use "ip" as either a prefix or an infix for each of the responses. In a specific exemplary embodiment, each of the sub-nodes 501, 503, 505 is limited to seven responses. A skilled artisan will realize that number of responses may be increased depending on the largest possible packet that may be reliably transmitted within a single TCP packet as noted above.

For example, the plurality of response within the "ipo_" sub-node 503 could include terms "ipod," "ipod nano," "Apple ipod," "ipod touch," and so on. The plurality of responses "iph_" sub-node 505 could include "Apple iphone," "iphone," "unlocked iphone," and other responses based on an anticipated possible end-user input of "h" entered after "ip." The "ipr_" sub-node 507 includes, for example, "neosat ipro pvr" and "ipro software." Any combination of letters for which no keyword exists, such as "ipz," simply returns wither a null set or a "No Suggestions" return.

The predictive method can anticipate what the end-user's search or query might be based on a database containing information from perhaps billions of prior searches or queries. The database is maintained within, for example, the one or more storage databases 131 of the information storage and retrieval platform 120 of FIG. 1. If the end-user is attempting to query the word "iphone," the browser will not need to send a request after the end-user enters "iph_" because it already has what is needed from the previous request. The prediction of the end-users next entry has been predicted based on a frequency of similar searches or queries having already occurred and been stored. Thus, subsequent end-user requests over the network 117 (FIG. 1) are either limited or unnecessary.

Several benefits accrue from use of the predictive method disclosed herein. By appending prediction data, the request frequency is decreased by 83% from the client side since most keyword lists of current sub-nodes have been already predicted successfully based on the huge amount of data stored in the information storage and retrieval platform 120. There simply is no need to send a request again. An average response time to a query or search is also decreased since most of the time data are already in memory. Thus, the end-user's browser is able to show the data immediately upon only entering one or two characters. Additionally, there is no data transmission response time difference between responses to each entered character of the prior art and all probable responses being sent concurrently as described herein since both are transmitted via only a single TCP package. Since the request frequency based on multiple searches or queries is reduced, the workload of the web server is also reduced commensurately.

While various embodiments of the present invention are described with reference to assorted implementations and exploitations, it will be understood that these embodiments are illustrative only and that a scope of the present inventions are not limited to them. In general, techniques for the predictive algorithm or method may be implemented with facilities consistent with any hardware system or hardware systems defined herein. Many variations, modifications, additions, and improvements are possible.

Plural instances may be provided for resources, operations, or structures described herein as a single instance. Finally, boundaries between various resources, operations, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of the present invention is represented by the appended claims.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 6:
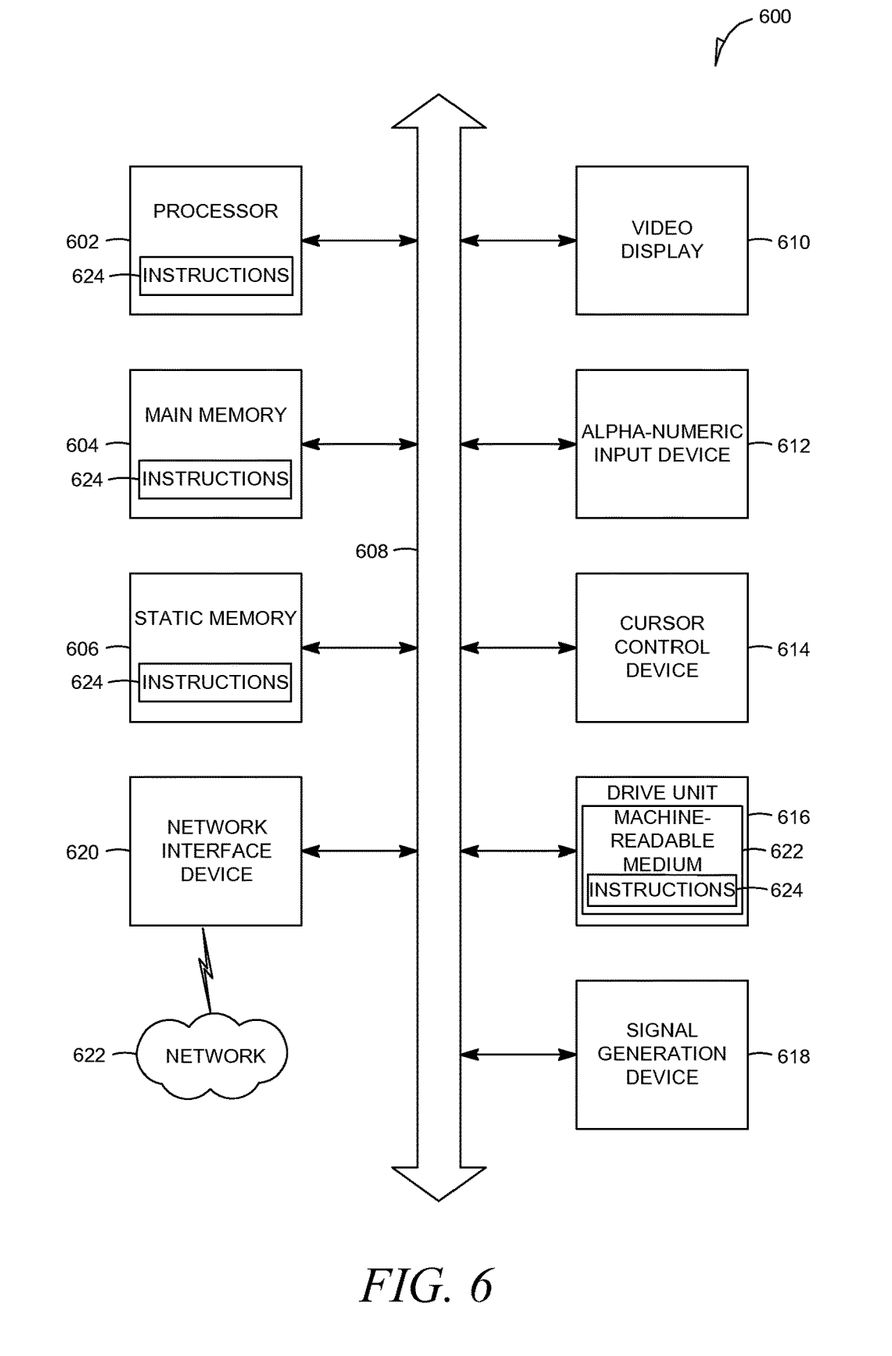
FIG. 6 is a simplified block diagram of a machine in an exemplary form of a computing system within which a set of instructions, for causing the machine to perform any one or more of the methodologies discussed herein, may be executed.

With reference to FIG. 6, an exemplary embodiment extends to a machine in the exemplary form of a computer system 600 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

Machine-Readable Medium

The disk drive unit 616 includes a machine-readable medium 622 on which is stored one or more sets of instructions and data structures (e.g., software 624) embodying or used by any one or more of the methodologies or functions described herein. The software 624 may also reside, completely or at least partially, within the main memory 604 or within the processor 602 during execution thereof by the computer system 600; the main memory 604 and the processor 602 also constituting machine-readable media.

While the machine-readable medium 622 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 624 may further be transmitted or received over a communications network 622 using a transmission medium via the network interface device 620 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an embodiment has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, particular embodiments describe various arrangements, algorithms, programming tools, and topologies of systems. A skilled artisan will recognize, however, that additional embodiments may be focused on electronic business applications and accompanying system architectures in general and not specifically to electronic searching of consumer sites.

These and various other embodiments are all within a scope of the present invention. The specification and drawings are, accordingly, to be regarded in an illustrative rather than a restrictive sense.

What is claimed is:

1. A method to provide auto-complete responses to a search request, the method comprising:
   receiving, from an end-user, one or more characters forming a portion of the search request; and
   prior to receiving a completed version of the search request from the end-user:
      identifying, within a data structure, a node having a prefix matching the one or more characters received from the end-user, the node including a first list of recommendation keywords stored within the data structure and a plurality of sub-nodes separate from the first list of recommendation keywords, each sub-node corresponding to a different prefix adding at least one character to the one or more characters and including a corresponding list of recommendation keywords;
      selecting a plurality of most probable sub-nodes from the plurality of sub-nodes within the data structure, the most probable sub-nodes comprising sub-nodes that have the most recommendation keywords, each sub-node including a corresponding list of keywords;
      preparing a plurality of auto-complete responses based on the first list of recommendation keywords from the node and the corresponding lists of recommendation keywords from the most probable sub-nodes;
      fitting the plurality of auto-complete responses within a single communications packet; and
      upon fitting the single communications packet, returning the plurality of auto-complete responses as a reply to the search request.

2. The method of claim 1, wherein the returning the plurality of responses includes sending an additional plurality of responses from a plurality of other sub-nodes.

3. The method of claim 1, further comprising enlarging the packet size and wherein the returning of the plurality of responses includes one TCP package.

4. The method of claim 1, further comprising applying a compression utility to the plurality of responses prior to fitting the plurality of responses within the single communications packet.

5. A method of providing a plurality of auto-complete responses to a search request, the method comprising:
   receiving, via a pre-established stable connection protocol and in a first single communications packet, a plurality of characters from the search request, a number of the plurality of characters received being based on a size to fit within the first single communications packet;
   prior to receiving a completed version of the search request:
      identifying, within a data structure, a node having a prefix matching the plurality of characters received from the end-user, the node including a first list of recommendation keywords stored within the data structure and a plurality of sub-nodes separate from the first list of recommendation keywords, each sub-node corresponding to a different prefix adding at least one character to the plurality of characters and including a corresponding list of recommendation keywords;
      selecting a plurality of most probable sub-nodes from the plurality of sub-nodes within the data structure, the most probable sub-nodes comprising sub-nodes that have the most recommendation keywords;
      preparing a plurality of auto-complete responses based on the first list of recommendation keywords from the node and the corresponding lists of recommendation keywords from the most probable sub-nodes;
      fitting the plurality of auto-complete responses within a single communications packet; and
      upon fitting the single communications packet, returning the plurality of auto-complete responses as a reply to the search request.

6. The method of claim 5, further comprising predictively matching each of a plurality of keywords, generated from the plurality of characters, based on a subset of most popular queries from within the data structure.

7. The method of claim 5, further comprising enlarging the packet size and wherein the returning of the plurality of responses includes one TCP package.

8. The method of claim 5, further comprising applying a compression utility to the plurality of responses prior to fitting the plurality of responses within the single communications packet.

9. A tangible machine-readable storage medium having no transitory signals and storing instructions that, when executed by a processor, causes the processor to perform operations to provide a plurality of auto-complete responses to a search request from an end-user, the operations comprising:
   receiving, via a pre-established stable connection protocol and in a first single communications packet, a plurality of characters from the search request, a number of the plurality of characters received being based on a size to fit within the first single communications packet;

prior to receiving a completed version of the search request:

identifying, stored within a data structure, a node having a prefix matching the one or more characters, the node including a first list of recommendation keywords stored within the data structure and a plurality of sub-nodes separate from the first list of recommendation keywords, each sub-node corresponding to a different prefix adding at least one character to the one or more characters and including a corresponding list of recommendation keywords;

selecting a plurality of most probable sub-nodes from the plurality of sub-nodes within the data structure, the most probable sub-nodes comprising sub-nodes that have the most recommendation keywords;

preparing a plurality of auto-complete responses based on the first list of recommendation keywords from the node and the corresponding lists of recommendation keywords from the most probable sub-nodes;

fitting the plurality of auto-complete responses within a single communications packet; and upon fitting the single communications packet, returning the plurality of auto-complete responses as a reply to the search request.

10. The tangible machine-readable storage medium of claim 9, further comprising predictively matching each of a plurality of keywords, generated from the plurality of characters, based on a subset of most popular queries from within a database.

* * * * *